US009267268B2

(12) United States Patent
Arai et al.

(10) Patent No.: US 9,267,268 B2
(45) Date of Patent: Feb. 23, 2016

(54) MOTOR GRADER

(71) Applicant: KOMATSU LTD., Tokyo (JP)

(72) Inventors: Yuki Arai, Komatsu (JP); Eiji Yamazaki, Komatsu (JP)

(73) Assignee: KOMATSU LTD., Tokyo (JP)

( * ) Notice: Subject to any disclaimer, the term of this patent is extended or adjusted under 35 U.S.C. 154(b) by 133 days.

(21) Appl. No.: 14/360,427

(22) PCT Filed: Sep. 25, 2013

(86) PCT No.: PCT/JP2013/075939
§ 371 (c)(1),
(2) Date: May 23, 2014

(87) PCT Pub. No.: WO2014/192174
PCT Pub. Date: Dec. 4, 2014

(65) Prior Publication Data
US 2015/0308077 A1    Oct. 29, 2015

(51) Int. Cl.
E02F 9/08    (2006.01)
B60K 15/063    (2006.01)
E02F 3/76    (2006.01)

(52) U.S. Cl.
CPC .............. *E02F 9/0883* (2013.01); *B60K 15/063* (2013.01); *E02F 3/764* (2013.01); *E02F 3/765* (2013.01); *E02F 3/7645* (2013.01); *E02F 3/7654* (2013.01)

(58) Field of Classification Search
CPC ....... E02F 9/0883; E02F 3/7645; E02F 3/765; E02F 3/764; E02F 3/7654; E02F 3/76; E02F 3/80; B60K 15/063; B60K 15/067; B60K 15/073; B60K 2015/0636; B60K 2015/0638; B60W 2300/17; B60Y 2200/411
See application file for complete search history.

(56) References Cited

U.S. PATENT DOCUMENTS 4,087,101 A * 5/1978 Shimazaki ........... B60K 15/063
280/834
6,543,562 B1 * 4/2003 Repko ....................... E02F 3/80
180/54.1
(Continued)

FOREIGN PATENT DOCUMENTS

CN    101498262 A    8/2009
CN    102444148 A    5/2012
(Continued)

OTHER PUBLICATIONS

The Office Action for the corresponding Chinese patent application No. 201380003641.6, issued on Jan. 23, 2015.
(Continued)

Primary Examiner — John Walters
Assistant Examiner — Brian Swenson
(74) Attorney, Agent, or Firm — Global IP Counselors, LLP

(57) ABSTRACT

A motor grader includes a fuel tank, a vehicle body frame, a left-side mount part, a right-side mount part, a rear-side mount part and a reducing agent tank. The left-side mount part and the right-side mount part are respectively disposed on a left lateral frame and a right lateral frame while being disposed on the both sides of the fuel tank in a vehicle width direction, and fix the fuel tank to the vehicle body frame. The rear-side mount part is disposed on the left lateral frame in the vehicle width direction while being disposed rearward of the fuel tank, and fixes the fuel tank to the vehicle body frame. The reducing agent tank is disposed rearward of and adjacently to the fuel tank while being disposed on the right lateral frame side, and accumulates a reducing agent for processing an exhaust gas from an engine.

5 Claims, 10 Drawing Sheets

(56) References Cited

U.S. PATENT DOCUMENTS

| | | | |
|---|---|---|---|
| 6,550,811 B1 * | 4/2003 | Bennett | B60K 15/03 |
| | | | 180/314 |
| 6,938,928 B2 * | 9/2005 | Pfohl | B60K 15/04 |
| | | | 180/314 |
| 7,836,967 B2 | 11/2010 | Daniel et al. | |
| 8,403,099 B2 | 3/2013 | Yokota | |
| 8,695,827 B2 * | 4/2014 | Klauer | B60K 13/04 |
| | | | 141/369 |
| 2010/0018732 A1 | 1/2010 | Daniel et al. | |
| 2010/0192551 A1 | 8/2010 | Yokota | |
| 2012/0067660 A1 | 3/2012 | Kashu et al. | |
| 2013/0284752 A1 * | 10/2013 | Rund | B60K 15/03177 |
| | | | 220/660 |
| 2014/0191498 A1 * | 7/2014 | Shipp | B60K 15/067 |
| | | | 280/834 |

FOREIGN PATENT DOCUMENTS

| | | |
|---|---|---|
| JP | 4-72025 U | 6/1992 |
| JP | 2006-27316 A | 2/2006 |
| JP | 2008-137522 A | 6/2008 |
| JP | 2009-79422 A | 4/2009 |
| JP | 2011-529538 A | 12/2011 |

OTHER PUBLICATIONS

The International Search Report for the corresponding international application No. PCT/JP2013/075939, issued on Jan. 14, 2014.

* cited by examiner

MOTOR GRADER

CROSS-REFERENCE TO RELATED APPLICATIONS

This application is a U.S. National stage application of International Application No. PCT/JP2013/075939, filed on Sep. 25, 2013.

BACKGROUND

1. Field of the Invention

The present invention relates to a motor grader.

2. Background Information

In a well-known motor grader, a fuel tank has been mounted to a rear part of a vehicle body for the purpose of fueling (e.g., see Japan Laid-open Patent Application Publication No. JP-A-2006-27316).

A vehicle body frame of a motor grader described in Japan Laid-open Patent Application Publication No. JP-A-2006-27316 includes lateral frames disposed on the right and left of a fuel tank in the vehicle width direction, and a rear frame disposed rearward of the fuel tank. Further, the fuel tank is supported by the vehicle body frame through mount parts mounted to the lateral frames and the rear frame.

Incidentally, it has been demanded in recent years to install an exhaust processing device for processing exhaust gas in a motor grader. The exhaust processing device is connected to an engine through a connection pipe to process the exhaust gas from the engine. In some cases, a selective catalytic reduction device, configured to reduce nitrogen oxide (NOx) contained in the exhaust gas, is used as the exhaust processing device.

The selective catalytic reduction device is configured to process the exhaust gas using a reducing agent, such as an aqueous urea solution. Therefore, the motor grader is required to install a reducing agent tank for accumulating the reducing agent.

However, the aforementioned well-known motor grader has a drawback as described below.

Specifically, when being installed in the well-known motor grader, the reducing agent tank is demanded to be disposed at a height equivalent to that of the fuel tank to easily refill the reducing agent.

Therefore, when being disposed, the reducing agent tank is required to be located further rearward of the rear frame that supports the fuel tank on the rear side of the fuel tank. Thus, the vehicle body is inevitably increased in its length. Along with an increase in a length of the vehicle body, a drawback is produced that the steering performance and weight balance of the vehicle body are deteriorated.

In view of the drawback of the well-known motor grader, it is an object of the present invention to provide a motor grader in which vehicle body extension attributed to installation of a reducing agent tank can be suppressed.

A motor grader according to a first exemplary embodiment of the present invention includes a fuel tank, a vehicle body frame, lateral support parts, a rear support part and a reducing agent tank. The fuel tank accumulates a fuel. The vehicle body frame includes a pair of first and second lateral frames disposed on both sides of the fuel tank in a vehicle width direction, and supports the fuel tank. The lateral support parts are respectively mounted to the first and second lateral frames while being disposed on the both sides of the fuel tank in the vehicle width direction, and fix the fuel tank to the vehicle body frame. The rear support part is mounted to the first lateral frame while being disposed rearward of the fuel tank, and fixes the fuel tank to the vehicle body frame. The reducing agent tank is disposed rearward of and adjacently to the fuel tank while being disposed closer to the second lateral frame with reference to a middle in the vehicle width direction, and accumulates a reducing agent for processing an exhaust gas from an engine.

Thus, the rear support part for fixing the fuel tank to the vehicle body frame is disposed on any one of the right and left lateral frames, i.e., the first lateral frame in the vehicle width direction. Accordingly, a space is produced for disposing the reducing agent tank in a position closer to the other second lateral frame with reference to the middle in the vehicle width direction. Therefore, the reducing agent tank can be disposed rearward of and adjacently to the fuel tank.

Consequently, extension of the vehicle body can be suppressed even when the reducing agent tank is installed.

In a motor grader according to a second exemplary embodiment of the present invention, the rear support part is attached to the first lateral frame while being disposed to protrude from the first lateral frame toward the second lateral frame. Further, the reducing agent tank is disposed between the rear support part and the second lateral frame in a view seen in a vehicle body back-and-forth direction, while being disposed in a position overlapped with at least a portion of the rear support part in a view seen in the vehicle width direction.

Thus, the rear support part for fixing the fuel tank to the vehicle body frame is attached to the first lateral frame. Accordingly, the reducing agent tank can be disposed rearward of the fuel tank and between the rear support part and the second lateral frame in a view seen in the vehicle body back-and-forth direction, while being disposed in the position overlapped with at least a portion of the rear support part seen in the vehicle width direction.

Therefore, even when the reducing agent tank is disposed, extension in length of the vehicle body can be suppressed at least by the overlapped length between the rear support part and the reducing agent tank in comparison with a well-known structure.

When the reducing agent tank is installed, the installation of the reducing agent tank can be achieved while an extension in a length of the vehicle body of the motor grader can be suppressed.

In a motor grader according to a third exemplary embodiment of the present invention, the vehicle body frame includes a rear frame disposed rearward of the reducing agent tank. Further, the reducing agent tank is supported by the rear frame.

Thus, the reducing agent tank is supported by the rear frame, and thereby, is not required to make contact with the fuel tank disposed on the front side of the reducing agent tank. Further, the reducing agent tank is not required to be fixed to the lateral frames to which the lateral support parts are mounted for fixing the fuel tank.

Therefore, heat is inhibited from being transferred from the fuel tank to the reducing agent tank. Accordingly, the reducing agent within the tank is maintained in a predetermined temperature range and efficiently processes nitrogen oxide.

In a motor grader according to a fourth exemplary embodiment of the present invention, a clearance is produced between the fuel tank and the reducing agent tank.

Thus, with the clearance produced between the fuel tank and the reducing agent tank, the heat transferred from the engine to the fuel tank can be inhibited from being further transferred to the reducing agent tank. Accordingly, the reducing agent within the tank is maintained in a predetermined temperature range and efficiently processes nitrogen oxide.

In a motor grader according to a fifth exemplary embodiment of the present invention, the reducing agent tank has a fluid supply port through which the reducing agent is supplied thereto, and the fluid supply port is disposed on the second lateral frame side.

As described above, the rear support part is disposed on the first lateral frame, whereas the fluid supply port is disposed on the second lateral frame side, i.e., the opposite side of the first lateral frame. Thus, when the fluid supply port is disposed on the opposite side of the rear support part, the reducing agent can be easily supplied, because the fluid supply port can be herein disposed closer to the lateral surface side of the vehicle body in comparison with when the fluid supply port is disposed on the same side as the rear support part.

According to the present invention, it is possible to provide a motor grader in which vehicle body extension attributed to installation of a reducing agent tank can be suppressed.

DESCRIPTION OF THE EXEMPLARY EMBODIMENTS

With reference to drawings, explanation will be made for a motor grader according to an exemplary embodiment of the present invention.

Entire Structure of Motor Grader 1

Figure 1:
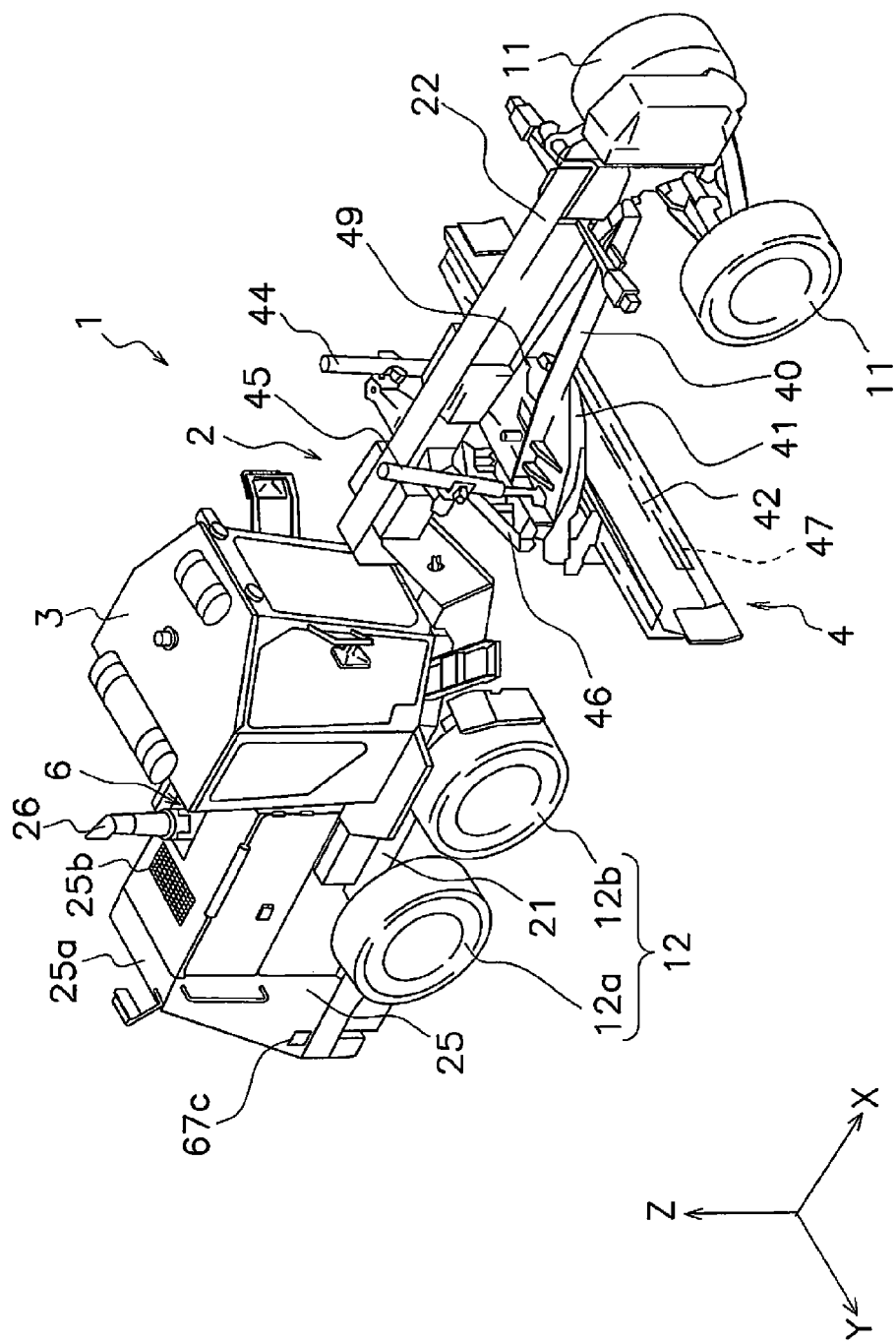
FIG. 1 is an external perspective view of a motor grader according to an exemplary embodiment.
Figure 2:
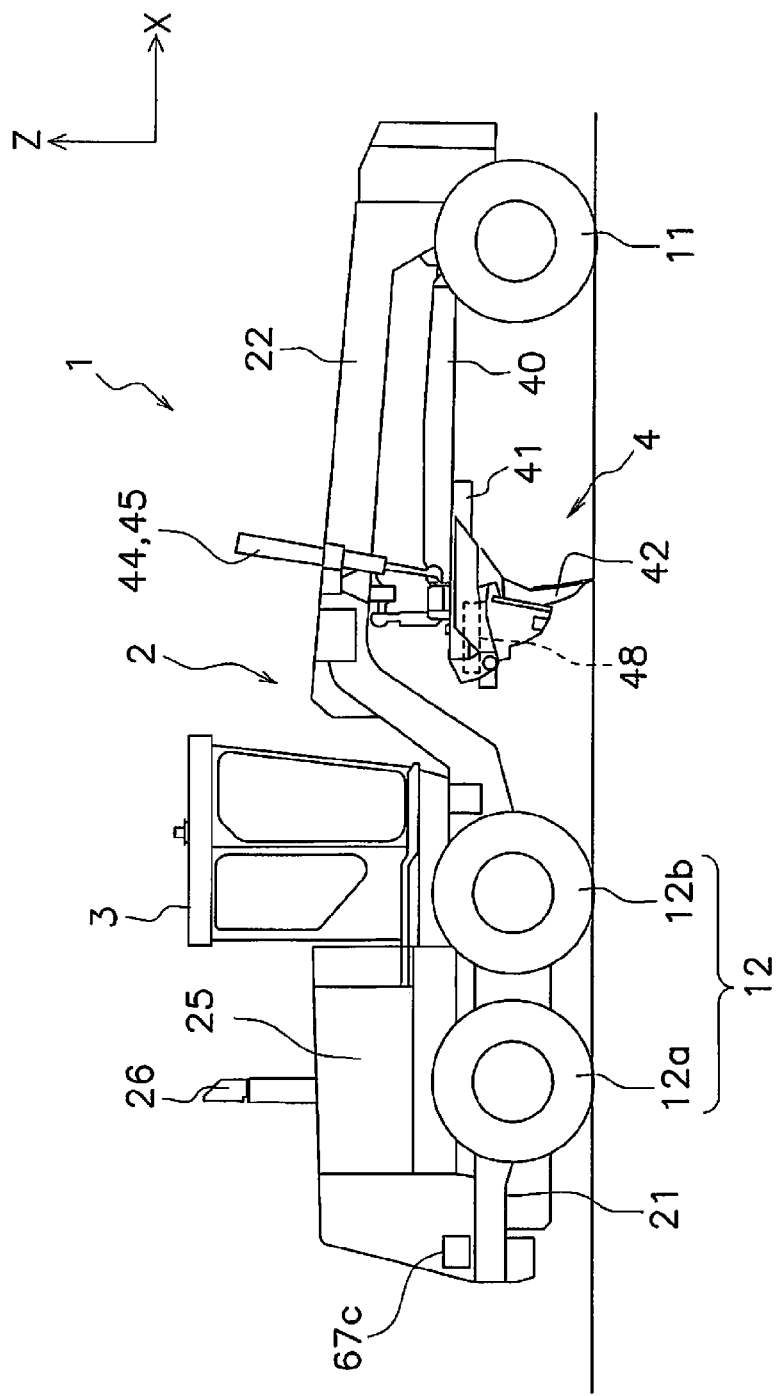
FIG. 2 is a side view of the motor grader.

FIG. 1 is an external perspective view of a motor grader according to an exemplary embodiment of the present invention. FIG. 2 is a side view of the motor grader according to the exemplary embodiment.

A motor grader 1 according to the exemplary embodiment includes front wheels 11 and rear wheels 12. The front wheels 11 are a pair of wheels mounted to the right and left sides of a vehicle body. The rear wheels 12 are composed of a right-and-left pair of rear wheels 12a and a right-and-left pair of rear wheels 12b. The rear wheels 12a and the rear wheels 12b are disposed in alignment with each other, while the rear wheels 12a are located on the rear side of the rear wheels 12b.

The motor grader 1 can perform a variety of works (e.g., leveling, snow removal, light cutting, material mixture, etc.) using a blade 42 disposed between the front wheels 11 and the rear wheels 12. It should be noted that in the following explanation, the term "back-and-forth direction" means a back-and-forth direction of the vehicle body seen from an operator seated in a cab 3. Further, the term "right-and-left direction" or "lateral" means a vehicle width direction of the motor grader, and is also a right-and-left direction seen from the operator seated in the cab 3. Yet further, in the drawings, the back-and-forth direction is indicated by an x-axis; the right-and-left direction is indicated by a y-axis; and an up-and-down direction is indicated by a z-axis.

Figure 3:
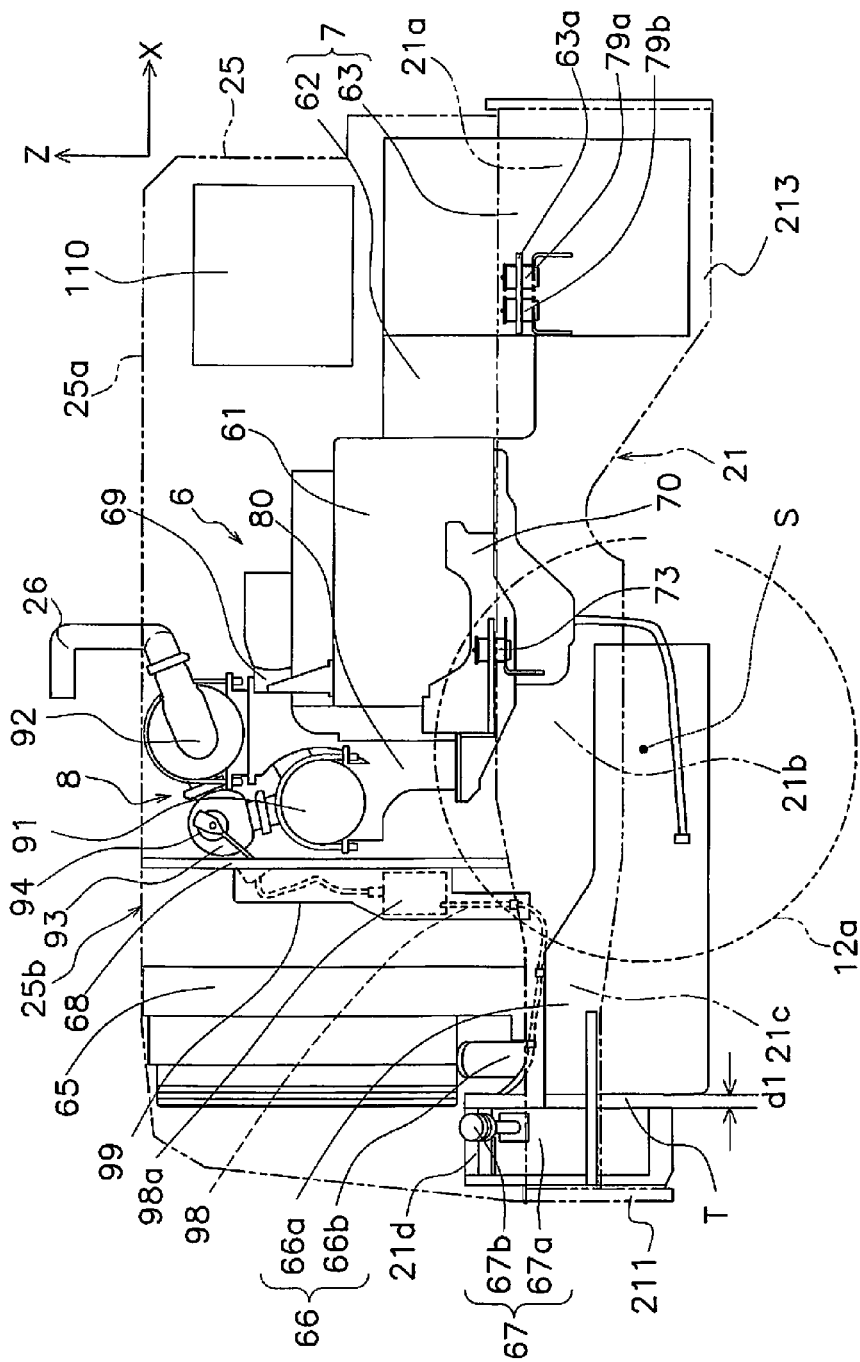
FIG. 3 is a side view of an internal structure of an engine compartment of the motor grader in FIG. 1.

As illustrated in FIGS. 1 and 2, this motor grader 1 includes a vehicle body frame 2, the cab 3, a work implement 4 and components disposed in an engine compartment 6 (see FIG. 3).

Vehicle Body Frame 2

As illustrated in FIGS. 1 and 2, the vehicle body frame 2 includes a first frame 21, a second frame 22 and an exterior cover 25.

The second frame 22 is articulably attached to the front of the first frame 21 through a center pin (not illustrated in the drawings).

The first frame 21 supports the exterior cover 25, components disposed in the engine compartment 6 to be described, and so forth. The exterior cover 25 covers the engine compartment 6. Further, the aforementioned rear wheels 12 are mounted to the first frame 21. When the rear wheels 12 are rotationally driven by means of driving force from an engine 61 (see FIG. 3), the vehicle is caused to travel. Further, the front wheels 11 are mounted to the front end portion of the second frame 22.

Cab 3

The cab 3 is mounted onto the second frame 22. The cab 3 accommodates a handle, a shift lever, an operating lever for operating the work implement 4, a brake pedal, an accelerator pedal, an inching pedal, and so forth (not illustrated in the drawings) in the inside thereof. It should be noted that the cab 3 may be mounted onto the first frame 21.

Work Implement 4

The work implement 4 includes a drawbar 40, a circle 41, the blade 42, a hydraulic motor 49, a variety of hydraulic cylinders 44 to 48 and so forth. The hydraulic cylinders 44 to 48 are cylinders configured to be driven by means of hydraulic pressure to be supplied from a hydraulic pump.

Drawbar 40

The front end portion of the drawbar 40 is pivotably attached to that of the second frame 22. A pair of lift cylinders 44 and 45 is mounted to the second frame 22 and the drawbar 40, while being disposed roughly along the up-and-down direction. These lift cylinders 44 and 45 are disposed to be separated to the right and left of the second frame 22.

The rear end portion of the drawbar 40 is configured to be lifted up and down in conjunction with synchronous extension and contraction of the pair of these lift cylinders 44 and 45. Further, the drawbar 40 is configured to tilt up and down about an axis arranged along a vehicle travel direction in conjunction with unsynchronous extension and contraction of the lift cylinders 44 and 45.

Further, the drawbar shift cylinder 46 is attached to the second frame 22 and the lateral end portion of the drawbar 40. This drawbar shift cylinder 46 is disposed while being slanted with respect to the up-and-down direction. The position of the drawbar 40 can be changed with respect to the transverse direction (the right-and-left direction) by means of extension and contraction of this drawbar shift cylinder 46.

Circle 41

The circle 41 is rotatably attached to the rear end portion of the drawbar 40. The circle 41 is configured to be driven by the hydraulic motor 49 (see FIG. 1). The hydraulic motor 49 is configured to be driven by means of pressurized oil supplied thereto from the hydraulic pump (not illustrated in the drawings), and the circle 41 can be thereby rotated. The circle 41 is configured to be rotated in a clockwise or counterclockwise direction with respect to the drawbar 40 in a view seen from above of the vehicle.

Blade 42

The blade 42 is supported to be slidable in the right-and-left direction with respect to the circle 41 and pivotable up and down about an axis arranged in parallel to the right-and-left direction. The blade shift cylinder 47 is attached to the blade 42, while being supported by the circle. This blade shift cylinder 47 is disposed along the longitudinal direction of the blade. The blade 42 can be moved in the right-and-left direction (the longitudinal direction of the blade 42) with respect to the circle 41 by means of extension and contraction of the blade shift cylinder 47.

Further, the tilt cylinder 48 (see FIG. 2) is attached to the blade 42, while being supported by the circle 41. The blade 42 is pivoted about an axis arranged in parallel to the transverse direction (the right-and-left direction) in conjunction with the extension and contraction of the tilt cylinder 48. The tilt of the blade 42 can be thereby changed in the up-and-down direction. Thus, the tilt cylinder 48 can change the tilt angle of the blade 42 with respect to the travel direction.

Further, the blade 42 can be moved in the up-and-down direction in conjunction with the aforementioned lifting up and down of the rear end portion of the drawbar 40 by the lift cylinders 44 and 45. Moreover, the transverse position of the blade 42 can be changed in conjunction with changing of the transverse position of the drawbar 40 by the drawbar shift cylinder 46.

As described above, the blade 42 is allowed to perform the following actions through the drawbar 40 and the circle 41 lifting up and down with respect to the vehicle, tilt change with respect to the travel direction, tilt change with respect to the transverse direction, rotation, and shift in the right-and-left direction.

Internal Structure of Engine Compartment 6

FIG. 3 is a right side view of an internal structure of the engine compartment 6. For convenience of explanation, FIG. 3 depicts the contour of the first frame 21 on the vehicle right side, that of the exterior cover 25 and that of the rear-side rear wheel 12a with dashed two-dotted lines. As illustrated in FIG. 3, the first frame 21 herein has a front part 21a, a middle part 21b and a rear part 21c from front to rear in this order.

As illustrated in HG 3, the engine 61, a power transmission device 7, a radiator 65, a post-treatment unit 8, an operating oil tank 110 and so forth are disposed in the engine compartment 6. A fuel tank 66 and a reducing agent tank 67 are disposed under these components. The fuel tank 66 and the reducing agent tank 67 are attached to the first frame 21.

Engine 61

A fuel, accumulated in the fuel tank 66, is supplied to the engine 61. The engine 61 is configured to generate driving force by combusting the fuel and transmit the driving force to a torque converter 62 and the hydraulic pump (not illustrated in the drawings). As illustrated in FIG. 3, the engine 61 is disposed forward of a center axis S of a vehicle axle of the rear wheels 12a.

A mount bracket 70 is attached to the engine 61. The mount bracket 70 is elastically attached to the middle part 21b of the first frame 21 by means of a damper 73. It should be noted that another mount bracket 70 and another damper 73 are similarly mounted to the left lateral surface side.

Power Transmission Device 7

The power transmission device 7 is disposed in the front part of the engine compartment 6, and includes the torque converter 62 and a transmission 63. The torque converter 62 is disposed closer to the output side of the engine 61 than the transmission 63 is. The operating oil tank 110 is disposed over the torque converter 62 and the transmission 63.

Flanges 63a are attached to the transmission 63, while being attached to the front part 21a of the first frame 21 by means of dampers 79a and 79b. Thus, the torque converter 62 and the transmission 63 are elastically supported by the first frame 21. It should be noted that the flanges 63a, the dampers 79a and the dampers 79b are provided as a pair of right-side components and left-side components.

The transmission 63 includes hydraulic clutches and shift gears and so forth (not illustrated in the drawings) in the inside thereof. The transmission 63 is configured to convert the rotation speed and torque of an input shaft to be connected to the output side of the torque converter 62. The converted rotation speed and torque are transmitted from the output shaft of the transmission 63, through a final reducer and a tandem device (that are not illustrated in the drawings), finally to the rear wheels 12. The rear wheels 12 are thus rotationally driven, and the vehicle is caused to travel.

The hydraulic pump (not illustrated in the drawings) is disposed along with the transmission 63. The hydraulic pump is configured to drive the various clutches of the transmission 63, the hydraulic motor 49, and the various cylinders 44 to 48 by means of hydraulic pressure of the operating oil accumulated in the operating oil tank 110.

Radiator 65

The radiator 65 cools down coolant water of the engine 61. It should be noted that the radiator 65 is disposed rearward of the engine 61 and the post-treatment unit 8 in the vehicle. The radiator 65 is supported by the rear part 21c of the first frame 21. Due to the shape of the first frame 21, the radiator 65 is supported by the first frame 21 in a position lower than the position that the mount bracket 70 is supported.

Post-Treatment Unit 8

The post-treatment unit 8 includes a first post-treatment device 91, a second post-treatment device 92, a connection pipe 93 connecting the first post-treatment device 91 and the second post-treatment device 92, and a reducing agent injection device 94. Further, the post-treatment unit 8 is provided with a connection pipe 69 for feeding the exhaust gas of the engine 61 to the first post-treatment device 91 and an exhaust pipe 26 for discharging the exhaust gas processed by the post-treatment unit 8 to the outside.

In the exemplary embodiment, the first post-treatment device 91 is a diesel particulate filter device, for instance, and is configured to trap particulates contained in the exhaust gas with a filter. The trapped particulates are burnt by a heater attached to the filter.

As illustrated in FIG. 3, the first post-treatment device 91 is disposed between the radiator 65 and the engine 61. The first post-treatment device 91 has a roughly cylindrical contour and is disposed such that the center axis thereof is arranged along the vehicle width direction.

Further, the second post-treatment device 92 is a selective catalytic reduction device, for instance, and is configured to selectively reduce nitrogen oxide NOx by using a reducing agent with respect to the exhaust gas discharged from the first post-treatment device 91.

The second post-treatment device 92 has a roughly cylindrical contour and is disposed such that the center axis thereof is arranged along the vehicle width direction. The connection pipe 93, connecting the first post-treatment device 91 and the second post-treatment device 92, is disposed on the upper side of the first post-treatment device 91, whereas the second post-treatment device 92 is disposed on the front side of the connection pipe 93.

The reducing agent injection device 94 for injecting the reducing agent is mounted to the connection pipe 93.

It should be noted that the second post-treatment device 92 is disposed such that the highest position thereof is lower than or equal to that of the radiator 65. Therefore, a top surface 25*a* of the exterior cover 25 can be formed flat. Accordingly, it is possible to provide a good rearward view.

The aforementioned exhaust pipe 26 is connected to the second post-treatment device 92, while the upper part thereof is upwardly protruded from the exterior cover 25.

The engine 61, the connection pipe 69, the first post-treatment device 91, the connection pipe 93, the second post-treatment device 92 and the exhaust pipe 26 are sequentially connected in series. Therefore, the exhaust gas from the engine 61 passes through the first connection pipe 69 and is fed to the first post-treatment device 91. The first post-treatment device 91 mainly reduces particulates contained in the exhaust gas. Next, the exhaust gas passes through the connection pipe 93 and is fed to the second post-treatment device 92. The second post-treatment device 92 mainly reduces NOx. Thereafter, the purified exhaust gas is discharged to the outside through the exhaust pipe 26. It should be noted that the post-treatment unit 8 is provided with a post-treatment device supporting mount bracket 80, and the post-treatment device supporting mount bracket 80 is supported by the mount bracket 70 on one end of the mount bracket 70. Thus, the post-treatment unit 8 is elastically supported by the center part 21*b* of the first frame 21 through the post-treatment device supporting mount bracket 80 and the mount bracket 70.

Further as described above, the torque converter 62 and the transmission 63 are connected to each other, the torque converter 62 and the engine 61 are connected to each other, the engine 61 and the mount bracket 70 are connected to each other, and the mount bracket 70 and the post-treatment unit 8 are connected to each other. These components are all connected to the first frame 21 through the dampers 79*a*, 79*b* and 73. Therefore, the torque converter 62, the transmission 63, the engine 61 and the post-treatment unit 8 are unitarily vibrated, and are less easily affected by vibration from the first frame 21.

Detailed Structures of First Frame 21, Fuel Tank 66 and Reducing Agent Tank 67

Figure 4:
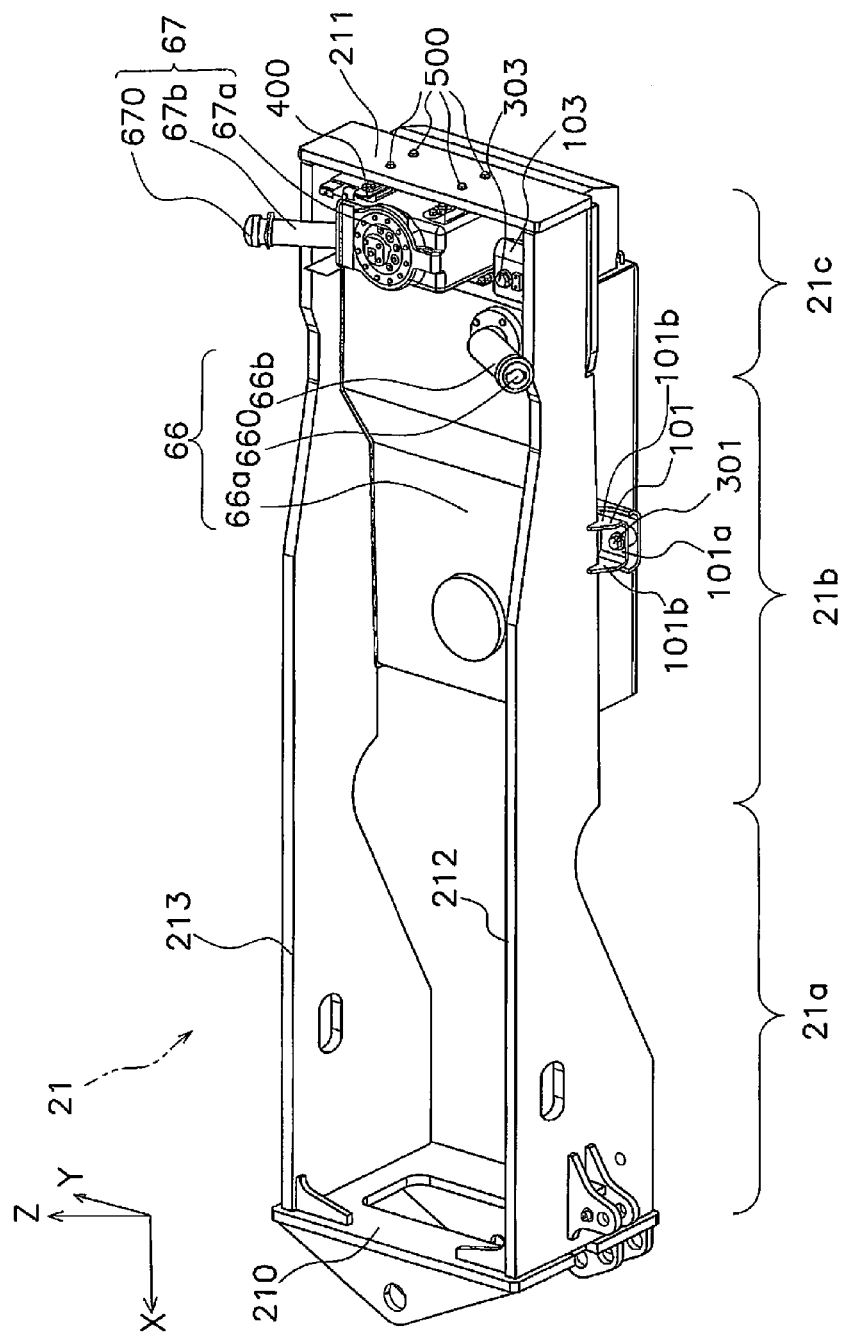
FIG. 4 is an external view of a first frame, a fuel tank and a reducing agent tank of the motor grader in FIG. 1.
Figure 5:
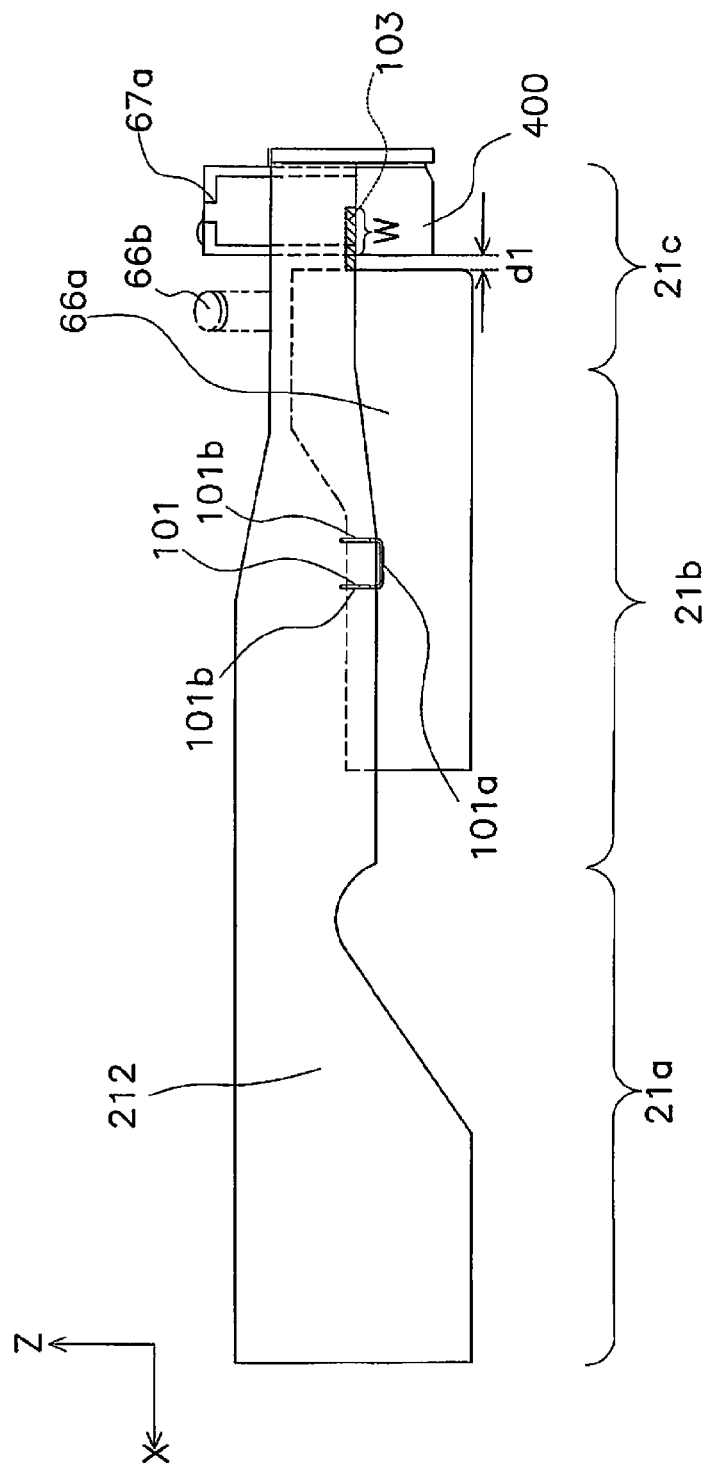
FIG. 5 is a schematic left side view of FIG. 4.
Figure 6:
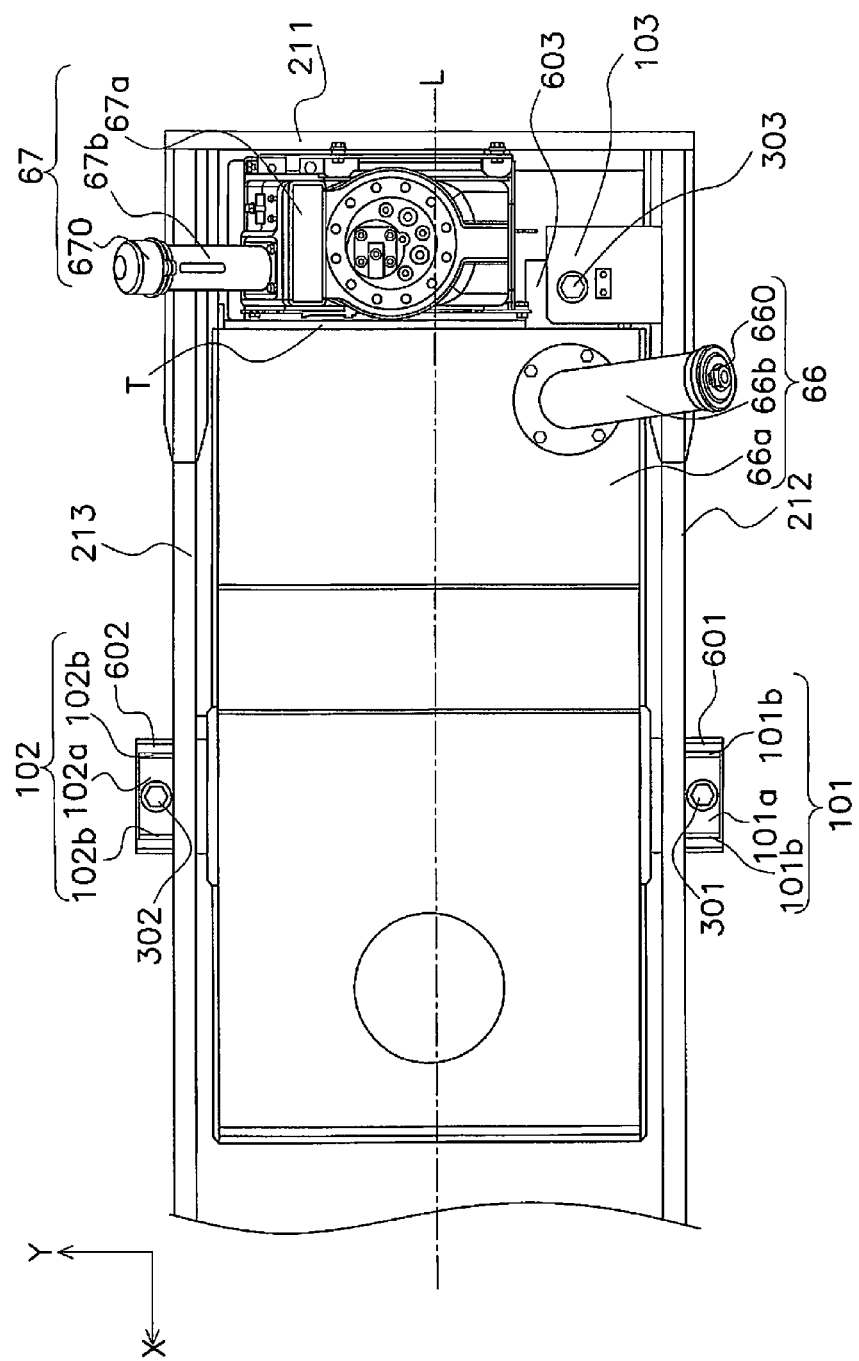
FIG. 6 is a plan view of a rear part in FIG. 4.

FIG. 4 is an external perspective view of the first frame 21, the fuel tank 66 and the reducing agent tank 67 in the exemplary embodiment. It should be noted that in FIG. 4, the left direction in the drawing indicates the vehicle front direction. FIG. 5 is a side view of the first frame 21 in the exemplary embodiment. FIG. 5 also illustrates the position of the fuel tank 66 and that of the reducing agent tank 67. FIG. 6 is a plan view of the first frame 21, the fuel tank 66 and the reducing agent tank 67 in the exemplary embodiment.

Structure of First Frame 21

Firstly, detailed explanation will be made for the structure of the first frame 21.

As illustrated in FIG. 4, the first frame 21 is formed in a roughly rectangular shape in a view seen from above. The first frame 21 includes a front frame 210, a rear frame 211, a left lateral frame 212 and a right lateral frame 213. The respective frames are roughly plate-shaped members, and are disposed such that the planes thereof are arranged in parallel to the vertical direction.

The front frame 210 and the rear frame 211 are disposed along the vehicle width direction (the right-and-left direction). The left lateral frame 212 couples the left end of the front frame 210 and that of the rear frame 211. The right lateral frame 213 couples the right end of the front frame 210 and that of the rear frame 211.

Left-Side Mount Part 101 and Right-Side Mount Part 102

A left-side mount part 101 is disposed for supporting the fuel tank 66 to be protruded outward (leftward) from a position of the lower end of a part located rearward of the middle part of the aforementioned left lateral frame 212. The left-side mount part 101 is formed in a roughly U-shape in a view seen from the left lateral side of the vehicle.

As illustrated in FIGS. 4 and 5, the left-side mount part 101 has a first mount portion 101*a* and a pair of second mount portions 101*b*. The first mount portion 101*a* is a roughly rectangular portion mounted perpendicularly to the lateral surface of the left lateral frame 212, and has a through hole (not illustrated in the drawings) in which a bolt 301 is inserted. Further, the second mount portions 101*b* are roughly triangular portions, and are upwardly extended from the front end and the rear end of the first mount portion 101*a*. The second mount portions 101*b* are perpendicularly fixed to the surface of the left lateral frame 212.

As illustrated in the plan view of FIG. 6, a right-side mount part 102 is disposed at a position on the right lateral frame 213 in opposition to the position of the left-side mount part 101 mounted to the left lateral frame 212, while being directed to the outward. The right-side mount part 102 has a shape similar to that of the left-side mount part 101, and a bolt 302 is inserted therein. As illustrated in FIG. 6, the left-side mount part 101 and the right-side mount part 102 are disposed to be bilaterally symmetric to each other with reference to a center line L in the vehicle width direction of the first frame 21.

Rear-Side Mount Part 103

As illustrated in FIG. 6, a rear-side mount part 103 is disposed rearward of the left-side mount part 101 and inside the left lateral frame 212 to support the fuel tank 66.

The rear-side mount part 103 is disposed on the rear part of the left lateral frame 212, while being formed to be protruded from the left lateral frame 212 toward the right lateral frame 213.

The rear-side mount part 103 is a plate-shaped member disposed from the lower end of the rear part of the left lateral frame 212 toward the right lateral frame 213. A through hole 103*s* (see FIG. 8), in which a bolt 303 is inserted, is bored in the tip end of the rear-side mount part 103.

As illustrated in FIG. 6, the rear-side mount part 103 is formed on the left-lateral-frame-212 side.

Detailed explanation will be made for the structure of the fuel tank 66 to be fixed to the aforementioned left-side mount part 101, right-side mount part 102 and rear-side mount part 103.

Fuel Tank 66

As illustrated in FIG. 3, the fuel tank 66 is supported by the first frame 21, while being disposed under the post-treatment unit 8 and the radiator 65. The fuel tank 66 is extended from a position under the engine 61 toward the vehicle rear side.

The fuel tank 66 has a fuel tank main body 66*a*, a fuel supply part 66*b*, a left-side attachment part 601, a right-side attachment part 602 and a rear-side attachment part 603.

The fuel tank main body 66*a* accumulates fuel. The fuel supply part 66*b* receives supply of fuel to be accumulated in the fuel tank main body 66*a*. As illustrated in FIGS. 4 and 6, the fuel supply part 66*b* is formed to protrude toward the left lateral surface of the motor grader 1, and as illustrated in FIG. 6, a fuel supply port 660 disposed on the tip end of the fuel supply part 66*b* is located outward of the left lateral frame 212. It should be noted that FIG. 6 illustrates a condition of the fuel supply port 660 closed with a lid. Further, the fuel supply port 660 of the fuel tank 66 is disposed inward of the exterior cover 25. Therefore, the fuel supply port 660 is covered with a lid (not illustrated in the drawings) formed on the exterior cover 25.

Figure 7:
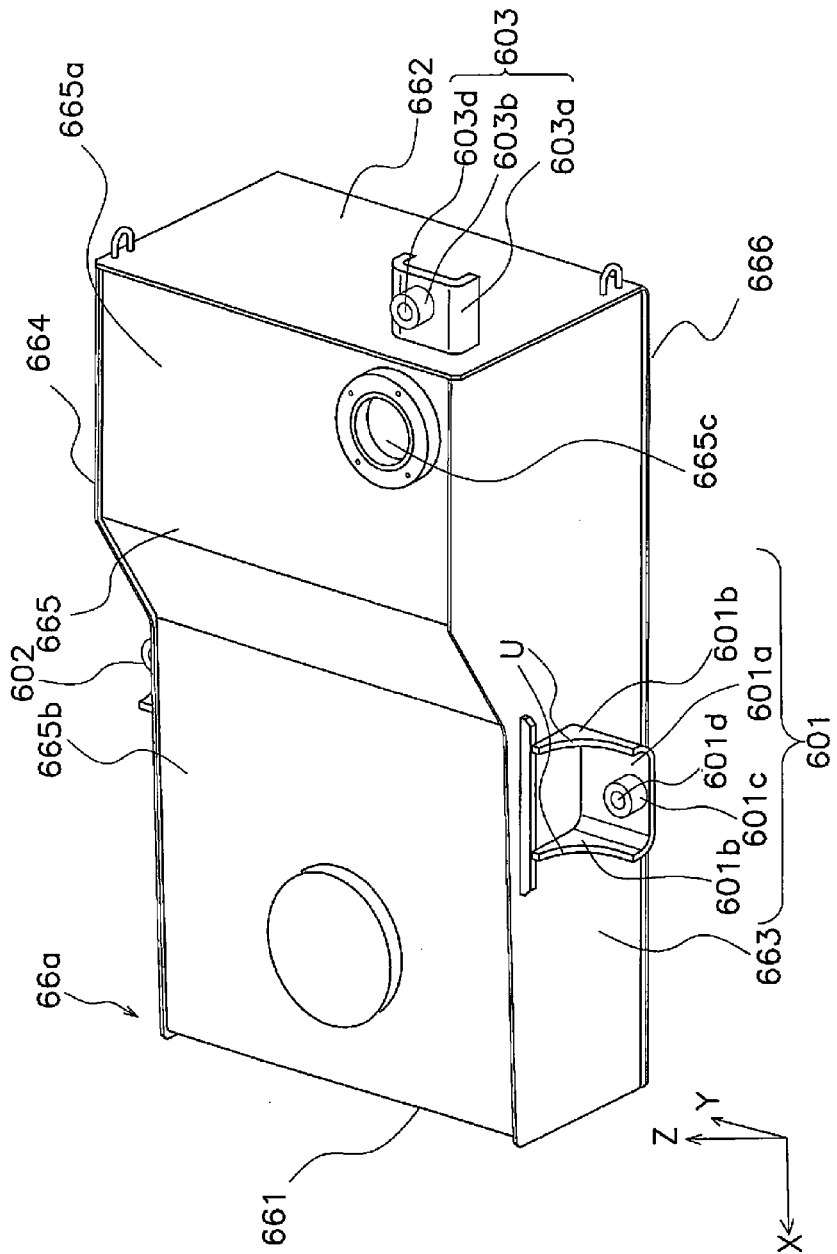
FIG. 7 is an external perspective view of a fuel tank main body in FIG. 4.

FIG. 7 is an external perspective view of the fuel tank main body 66a. Explanation will be made for the fuel tank main body 66a with reference to a direction under a condition that the fuel tank main body 66a is attached to the motor grader 1. As illustrated in FIG. 7, the fuel tank main body 66a is a box-shaped part elongated in the back-and-forth direction. The fuel tank main body 66a is composed of a front face 661, a rear face 662, a left lateral face 663, a right lateral face 664, a top face 665 and a bottom face 666.

The fuel tank main body 66a has a step on the top face 665 thereof. The step is formed in the back-and-forth direction such that a rear-side top face 665a is located in a position higher than a front-side top face 665b. Further, a hole 665c is bored in the rear-side top face 665a, while being located on the left-side-lateral-face-663 side. The fuel supply part 66b is attached to this hole 665c.

The left-side attachment part 601, the right-side attachment part 602 and the rear-side attachment part 603 are provided for attaching the fuel tank 66 to the first frame 21.

As illustrated in FIG. 7, the left-side attachment part 601 is disposed on the left lateral face 663 of the fuel tank main body 66a. The right-side attachment part 602 (see FIG. 6) is disposed at a position on the right lateral face 664 in opposition to the attached position of the left-side attachment part 601. As illustrated in FIG. 6, the left-side attachment part 601 and the right-side attachment part 602 are disposed to be bilaterally symmetric to each other with reference to the center line L in the vehicle width direction of the first frame 21.

This left-side attachment part 601 has a first attachment portion 601a, a pair of second attachment portions 601b and a third attachment portion 601c. The first attachment portion 601a is formed in a roughly rectangular shape. The first attachment portion 601a is disposed in parallel to the bottom face 666, while being disposed to outwardly protrude from the left lateral face 663. The second attachment portions 601b are upwardly extended from the front end and the rear end of the first attachment portion 601a. The second attachment portions 601b are fixed perpendicularly to the surface of the left lateral face 663. Further, ends U of the second attachment portions 601b are formed in a curved shape. The ends U are curved for preventing the second attachment portions 601b from interfering with the first frame 21 in attaching the fuel tank 66 to the first frame 21.

Further, the third attachment portion 601c is formed in a columnar shape, and is mounted onto the upper side of the first attachment portion 601a. A hole 601d, in which the bolt 301 is inserted, is bored in this third attachment portion 601c along the axial direction of the columnar shape. In attaching the fuel tank 66 to the first frame 21, the third attachment portion 601c is configured to be contacted to the first mount portion 101a of the left-side mount part 101 from below. Further, the bolt 301 is inserted from above into the through hole bored in the first mount portion 101a and the hole 601d bored in the third attachment portion 601c. A nut 701 (see FIG. 9) is then screwed onto the bolt 301 from below. Thus, the left-side attachment part 601 is fixed to the left-side mount part 101.

It should be noted that the right-side attachment part 602 is structured similarly to the left-side attachment part 601. The right-side attachment part 602 is fixed to the right-side mount part 102 by means of the bolt 302 and a nut 702 (see FIG. 9), while being disposed under the right-side mount part 102.

As illustrated in FIG. 7, the rear-side attachment part 603 is disposed to protrude from an left-side upper part of the rear face 662 (i.e., a position below the hole 665c). The rear-side attachment part 603 has a fourth attachment portion 603a perpendicularly protruded from the rear face 662 and a fifth attachment portion 603b mounted onto the upper side of the fourth attachment portion 603a. The fourth attachment portion 603a is formed in an inverted U-shape that is upwardly convex in a view seen from rear.

The fifth attachment portion 603b is formed in a columnar shape. A hole 603d, in which the bolt 303 is inserted, is bored in the fifth attachment portion 603b along the axial direction of the columnar shape. In attaching the fuel tank 66 to the first frame 21, the fifth attachment portion 603b is configured to be contacted to the rear-side mount part 103 from below. Further, the bolt 303 is inserted from above into the through hole bored in the rear-side mount part 103 and the hole 603d bored in the fifth attachment portion 603b. A nut is then screwed onto the bolt 303 from below. Thus, the rear-side attachment part 603 is fixed to the rear-side mount part 103.

As illustrated in FIGS. 4 and 6, the fuel tank 66 is attached to the first frame 21 from below. The left-side attachment part 601 of the fuel tank 66 is fixed to the left-side mount part 101 of the first frame 21 by means of the bolt 301 and the nut 701; the right-side attachment part 602 of the fuel tank 66 is fixed to the right-side mount part 102 of the first frame 21 by the bolt 302 and the nut 702, and the rear-side attachment part 603 of the fuel tank 66 is fixed to the rear-side mount part 103 of the first frame 21 by the bolt 303 and the nut (not illustrated in the drawings). Thus, the fuel tank 66 is fixed to the first frame 21 by the left-side mount part 101, the right-side mount part 102 and the rear-side mount part 103 of the first frame 21.

Next, detailed explanation will be made for the reducing agent tank 67 disposed inside the first frame 21.

Reducing Agent Tank 67

As illustrated in FIG. 3, the reducing agent tank 67 includes a reducing agent tank main body 67a for accumulating a reducing agent to be injected by the reducing agent injection device 94 and a fluid supply part 67b for supplying the reducing agent to the reducing agent tank main body 67a. In the exemplary embodiment, for instance, aqueous urea solution is used as the reducing agent. It should be noted that the aqueous urea solution is required to be maintained in a predetermined temperature range to be used as the reducing agent.

The reducing agent tank 67 is disposed rearward of the fuel tank 66, while being disposed adjacently thereto. With the arrangement that the reducing agent tank 67 is disposed rearward of the fuel tank 66, heat from the engine 61 is diffused to the entirety of the fuel tank 66 by the fuel contained inside the fuel tank 66. Hence, a part of heat from the engine 61, which is transferred to the reducing agent tank 78, is reduced. Further, the reducing agent tank 67 is disposed in a position away from the engine 61 and the post-treatment devices 91 and 92 such that heat is less easily transferred thereto from these components.

As illustrated in FIG. 3, a top plate 21d is mounted onto the reducing agent tank 67. The reducing agent tank 67 is disposed rearward of the radiator 65 to reduce influence of heat dissipation. Further, with the top plate 21d herein provided, hot air from the radiator 65 is prevented from directly hitting the reducing agent tank 67. Thus, the reducing agent becomes less easily heated.

As illustrated in FIG. 4, the fluid supply part 67b is formed to protrude to the opposite side of the protruded direction of the fuel supply part 66b (i.e., toward the right lateral surface), and a fluid supply port 670 on the tip end thereof is disposed outward of the right lateral frame 213 as illustrated in FIG. 6. It should be noted that similarly to the fuel supply port 660, the fluid supply port 670 is also disposed inward of the exterior cover 25, while being covered with a lid 67c (see FIGS. 1 and 2) disposed on the exterior cover 25. The lid 67c is disposed in a position rearward of the rear wheels 12a. The height of the fluid supply port 670 can be thereby lowered. Thus, burden of a work for supplying the reducing agent is alleviated.

Further, as illustrated in FIG. 3, the reducing agent is fed from the reducing agent tank 67 to the reducing agent injection device 94 by a fluid feed pipe 98 and a drawing pump 98a. Further, a partition 68 is disposed between the post-treatment unit 8 and the fluid feed pipe 98 such that the heat from the engine 61 and the post-treatment devices 91 and 92 is less easily transferred to the fluid feed pipe 98. The partition 68 is supported by the radiator 65 through a support member (not illustrated in the drawings).

The exterior cover 25 has an intake port 25b (see FIGS. 1 and 3) formed between the radiator 65 and the partition 68 in a plan view in order to suck external air. A protection cover 99 is provided for covering the fluid feed pipe 98 and the drawing pump 98a to prevent the fluid feed pipe 98 from being extremely cooled down by means of the sucked external air and the cool air from the radiator 65.

Figure 8:
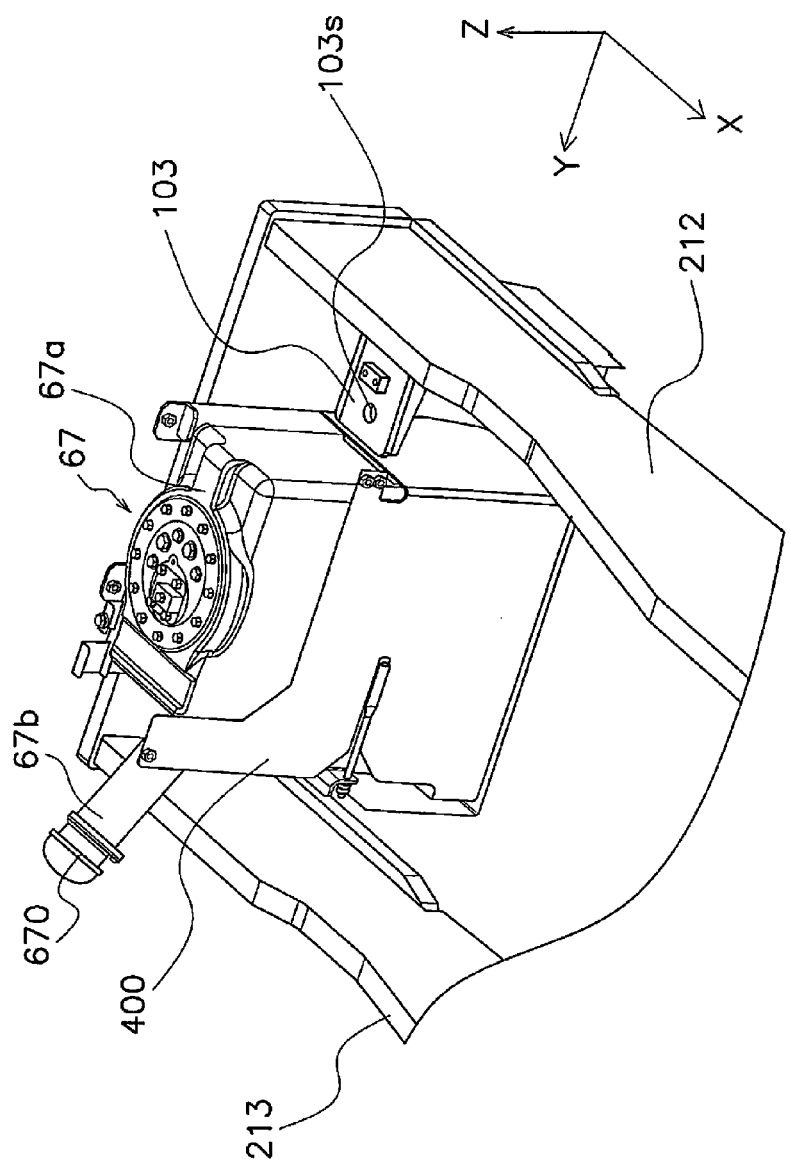
FIG. 8 is a perspective view of a condition that the fuel tank is detached from FIG. 4.

FIG. 8 is a perspective view of a rear part of the first frame 21. FIG. 8 illustrates a condition that the fuel tank 66 is removed.

As illustrated in FIG. 8, the reducing agent tank 67 is mounted to the inside of a bracket 400, while the bracket 400 is fixed to the first frame 21. The bracket 400 is shaped for covering the reducing agent tank 67. The bracket 400 has four bolt holes (not illustrated in the drawings) bored in the rear surface thereof. Similarly, the rear frame 211 has bolt holes that are bored in the front surface thereof to be located in corresponding positions to the bolt holes of the bracket 400. As illustrated in FIG. 4, bolts 500, inserted from rear into the bolt holes of the rear frame 211, penetrate through the bolt holes 400, while being screwed into nuts attached from front. Thus, the bracket 400 in which the reducing agent tank 67 is disposed is fixed to the first frame 21.

Positional Relation Between Reducing Agent Tank 67 and Rear-Side Mount Part 103

As illustrated in FIGS. 6 and 8, the reducing agent tank 67 is disposed between the left lateral frame 212 and the right lateral frame 213, and is disposed closer to the right lateral frame 213 with reference to the middle of the frames 212 and 213 in the vehicle width direction. In other words, the mar-side mount part 103 is formed on the left-lateral-frame-212 side. Hence, it can be expressed that the reducing agent tank 67 is disposed between the rear-side mount part 103 and the right lateral frame 213, while being aligned with the rear-side mount part 103 in the vehicle width direction.

Further, when described in detail, the reducing agent tank 67 is disposed between the rear-side mount part 103 and the right lateral frame 213 in a view seen in the vehicle body back-and-forth direction as illustrated in FIGS. 6 and 8, while being disposed in a position overlapped with at least a portion of the rear-side mount part 103 (depicted with hatching in FIG. 5) in a view seen in the vehicle width direction as illustrated in FIG. 5. This overlapped portion is indicated with W in FIG. 5.

Figure 9:
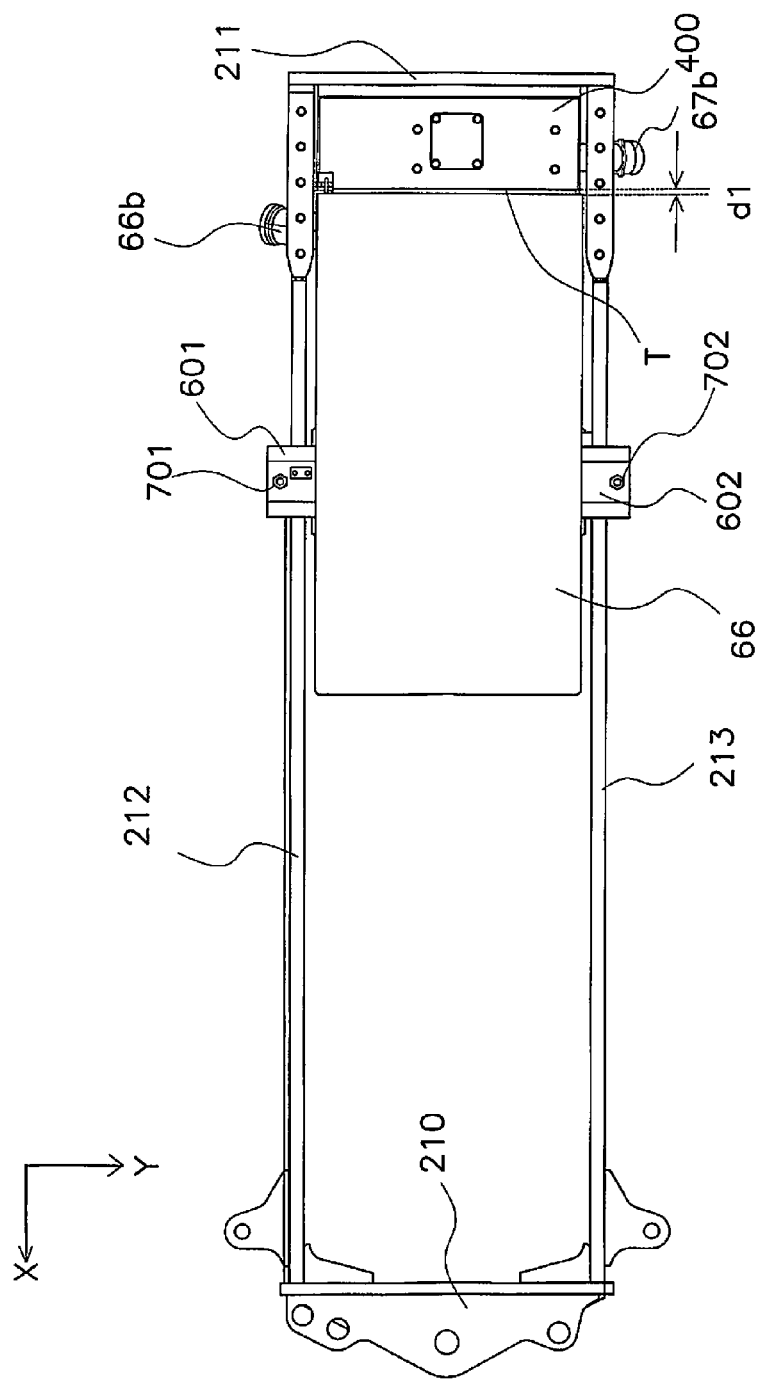
FIG. 9 is a bottom view of FIG. 4.

FIG. 9 is a bottom view of the first frame 21, the fuel tank 66 and the reducing agent tank 67 of the motor grader 1 of the exemplary embodiment. As illustrated in FIG. 9, a clearance T is produced between the fuel tank 66 and the bracket 400 covering the reducing agent tank 67. With this clearance T herein produced, it is possible to prevent heat of the fuel tank 66 from being easily transferred to the reducing agent tank 67.

A dimension dl of the clearance T can be set to be roughly 30 mm, for instance, whereas a clearance produced between the fuel tank 66 and the reducing agent tank 67 can be set to be roughly 40 mm.

Actions, Effects and so Forth

As illustrated in FIGS. 4 and 6, the motor grader 1 of the exemplary embodiment includes the fuel tank 66, the vehicle body frame 2, the left-side and right-side mount parts 101 and 102 (exemplary lateral support parts), the rear-side mount part 103 (an exemplary rear support part) and the reducing agent tank 67. The fuel tank 66 accumulates the fuel. The vehicle body frame 2 includes the left lateral frame 212 (an exemplary first lateral frame) and the right lateral frame 213 (an exemplary second lateral frame), which are disposed on the both sides of the fuel tank 66 in the vehicle width direction, and supports the fuel tank 66. The left-side mount part 101 and the right-side mount part 102 are respectively mounted to the left lateral frame 212 and the right lateral frame 213 while being disposed on the both sides of the fuel tank 66 in the vehicle width direction, and fix the fuel tank 66 to the vehicle body frame 2. The rear-side mount part 103 is mounted to the left lateral frame 212 (the exemplary first lateral frame) while being disposed rearward of the fuel tank 66, and fixes the fuel tank to the vehicle body frame 2. The reducing agent tank 67 is disposed rearward of and adjacently to the fuel tank 66 while being disposed closer to the right lateral frame 213 (the exemplary second lateral frame) with reference to the middle in the vehicle width direction, and accumulates the reducing agent for processing the exhaust gas from the engine 61.

Thus, the rear-side mount part 103 for fixing the fuel tank 66 to the vehicle body frame 2 is disposed on the left lateral frame 212 in the vehicle width direction. Accordingly, it is possible to produce a space for disposing the reducing agent tank 67 in a position closer to the right lateral frame 213 with reference to the middle in the vehicle width direction. Therefore, the reducing agent tank 67 can be disposed rearward of and adjacently to the fuel tank 66.

Consequently, extension of the vehicle body can be suppressed even when the reducing agent tank 67 is installed.

In the aforementioned exemplary embodiment, the rear-side mount part 103 is attached to the left lateral frame 212 (the exemplary first lateral frame), while being disposed to protrude from the left lateral frame 212 toward the right lateral frame 213 (the exemplary second lateral frame). The reducing agent tank 67 is disposed rearward of the fuel tank 66 and between the rear-side mount part 103 (the exemplary rear support part) and the right lateral frame 213 (the exemplary second lateral frame) in a view seen in the vehicle body back-and-forth direction, while being disposed in the position (see W in HG 5) overlapped with at least a portion of the rear-side mount part 103 in a view seen in the vehicle width direction.

Thus, the rear-side mount part 103 for fixing the fuel tank 66 to the vehicle body frame 2 is attached to the left lateral frame 212. Accordingly, in the motor grader 1 of the exemplary embodiment, the reducing agent tank 67 can be disposed in the position overlapped with at least a portion of the rear-side mount part 103 in a view seen in the vehicle width direction by disposing the reducing agent tank 67 in the position between the rear-side mount part 103 and the right lateral frame 213 in a view seen in the vehicle body back-and-forth direction, in other words, in the position closer to the right lateral frame 213.

Therefore, in comparison with a well-known structure, extension in length of the vehicle body can be suppressed by the overlapped length between the rear-side mount part 103 and the reducing agent tank 67 (see the overlapped portion W in FIG. 5).

In the exemplary embodiment, even when the reducing agent tank 67 is installed in the motor grader 1, installation of the reducing agent tank can be achieved while extension in length of the vehicle body of the motor grader can be suppressed.

In the motor grader 1 of the exemplary embodiment, the vehicle body frame 2 has the rear frame 211 disposed rearward of the reducing agent tank 67. Further, the reducing agent tank 67 is supported by the rear frame 211.

Thus, the reducing agent tank 67 is supported by the rear frame 211, and thereby, is not required to make contact with the fuel tank 66 disposed on the front side of the reducing agent tank 67. Further, the reducing agent tank 67 is not required to be fixed to the left lateral frame 212 and the right lateral frame 213 to which the left-side mount part 101 and the right-side mount part 102 are disposed for fixing the fuel tank 66.

Therefore, heat is inhibited from being transferred from the fuel tank 66 to the reducing agent tank 67. Accordingly, the reducing agent within the tank is maintained in a predetermined temperature range and efficiently processes nitrogen oxide.

In the motor grader 1 of the exemplary embodiment, the clearance (see T in FIG. 9) is produced between the fuel tank 66 and the reducing agent tank 67.

Thus, with the clearance produced between the fuel tank 66 and the reducing agent tank 67, the heat transferred from the engine 61 to the fuel tank 66 can be inhibited from being further transferred to the reducing agent tank 67. Accordingly, the reducing agent within the tank is maintained in a predetermined temperature range and efficiently processes nitrogen oxide.

In the motor grader 1 of the exemplary embodiment, the reducing agent tank 67 has the fluid supply port 670 through which the reducing agent is supplied thereto, and the fluid supply port 670 is disposed on the right-lateral-frame-213 (the exemplary second lateral frame) side.

As described above, the rear-side mount part 103 is disposed on the left lateral frame 212, whereas the fluid supply port 670 is disposed on the right-lateral-frame-213 side, i.e., the opposite side of the left lateral frame 212. Thus, when the fluid supply port 670 is disposed on the opposite side of the rear-side mount part 103, the reducing agent can be easily supplied, because the fluid supply port 670 can be herein disposed closer to the lateral surface side of the vehicle body in comparison with when the fluid supply port 670 is disposed on the same side as the rear-side mount part 103.

Other Exemplary Embodiments

In the aforementioned exemplary embodiment, the rear-side mount part 103 is disposed closer to the left lateral frame 212 with reference to the center line L, whereas the reducing agent tank 67 is disposed closer to the right lateral frame 213 with reference to the center line L. However, arrangement of these components is not limited to the above, and the position of the rear-side mount part 103 and that of the reducing agent tank 67 may be exchanged.

In the aforementioned exemplary embodiment, it has been described that the structure of the left lateral frame 212 and that of the right lateral frame 213 are the same. However, the structures of these frames may not be the same. For example, it is more preferable to increase the strength of a part of the left lateral frame 212, i.e., a part located in the vicinity of where the rear-side mount part 103 is formed, in comparison with the strength of the right lateral frame 213. This is intended to prevent torsion from being caused in the fuel tank 66, because in the motor grader 1, torsion is caused in the vehicle body frame 2 due to its structural feature.

In the aforementioned exemplary embodiment, as illustrated in FIG. 5, the reducing agent tank 67 is disposed to overlap with a portion (the portion W) of the rear-side mount part 103 in a view seen in the vehicle width direction. However, the reducing agent tank 67 may be disposed to overlap with the entirety of the rear-side mount part 103.

In the aforementioned exemplary embodiment, the left-side mount part 101 and the right-side mount part 102 are disposed to protrude to the outside of the first frame 21. However, these parts may be disposed to protrude to the inside.

Figure 10:
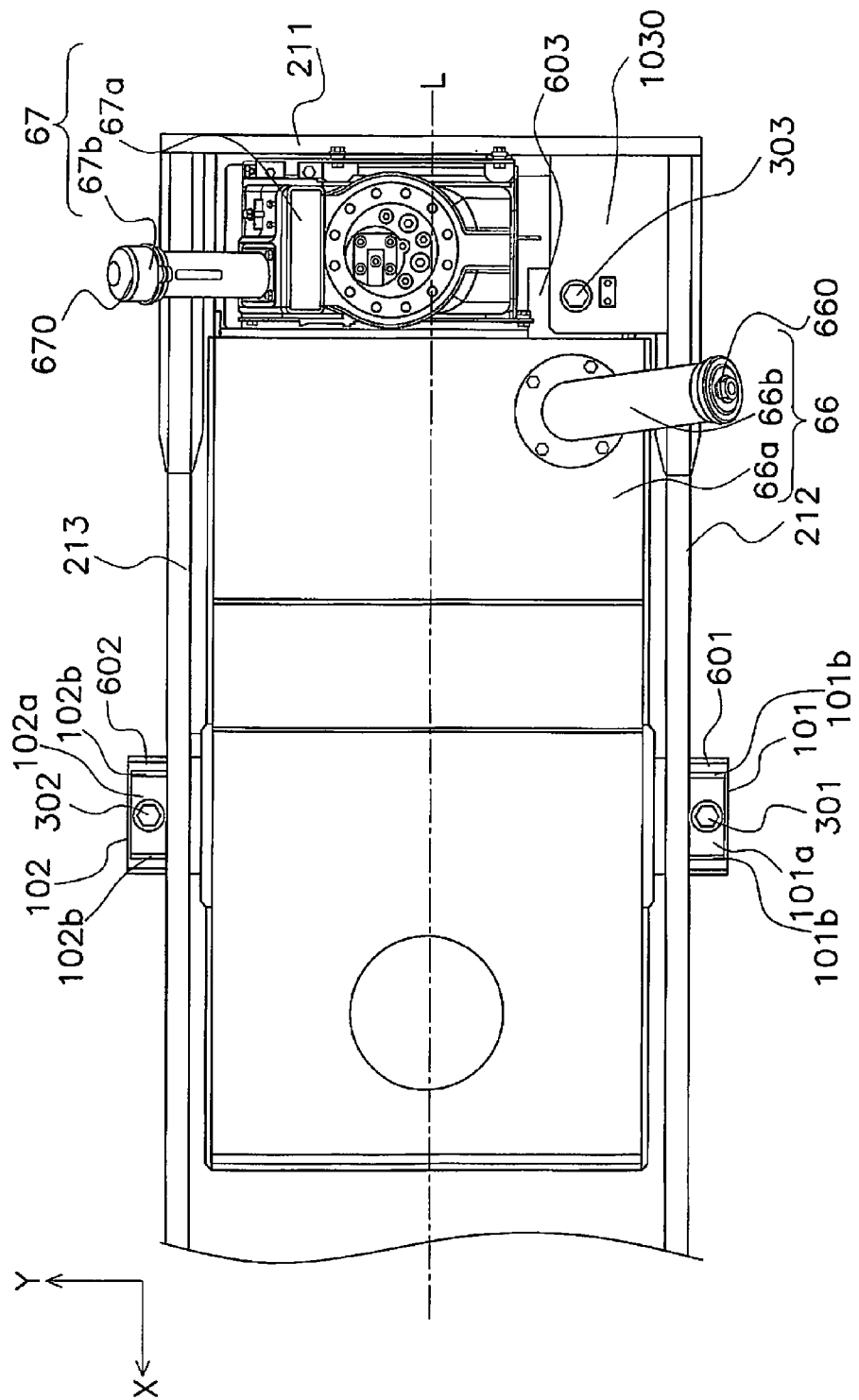
FIG. 10 is a plan view of a first frame, a fuel tank and a reducing agent tank for representing a motor grader according to a modification of an exemplary embodiment.

In the aforementioned exemplary embodiment, the rear-side mount part 103 is attached to only the left lateral frame 212. However, as with a rear-side mount part 1030 illustrated in FIG. 10, the rear-side mount part may be attached to both of the rear frame 211 and the left lateral frame 212.

The exemplary embodiments of the present invention have an advantageous effect of enabling suppression of vehicle body extension attributed to installation of a reducing agent tank, and is applicable to a motor grader and so forth.

The invention claimed is:

1. A motor grader, comprising:
   a fuel tank for accumulating a fuel;
   a vehicle body frame including a pair of first and second lateral frames disposed on first and second sides of the fuel tank in a vehicle width direction, the vehicle body frame supporting the fuel tank;
   lateral support parts being respectively disposed on the first and second lateral frames while being disposed on the first and second sides of the fuel tank in the vehicle width direction, the lateral support parts fixing the fuel tank to the vehicle body frame;
   a rear support part being disposed on the first lateral frame while being disposed rearward of the fuel tank, the rear support part fixing the fuel tank to the vehicle body frame; and
   a reducing agent tank being disposed rearward of and adjacently to the fuel tank while being disposed closer to the second lateral frame with reference to a middle in the vehicle width direction, the reducing agent tank accumulating a reducing agent for processing an exhaust gas from an engine.

2. The motor grader according to claim 1, wherein
   the rear support part is attached to the first lateral frame while being disposed to protrude from the first lateral frame toward the second lateral frame, and
   the reducing agent tank is disposed between the rear support part and the second lateral frame in a view seen in a vehicle body back-and-forth direction, while being disposed in a position overlapped with at least a portion of the rear support part in a view seen in the vehicle width direction.

3. The motor grader according to claim 1, wherein
   the vehicle body frame includes a rear frame disposed rearward of the reducing agent tank, and
   the reducing agent tank is supported by the rear frame.

4. The motor grader according to claim 1, wherein a clearance is produced between the fuel tank and the reducing agent tank.

5. The motor grader according to claim 1, wherein
the reducing agent tank has a fluid supply port through which the reducing agent is supplied thereto, and
the fluid supply port is disposed on the second lateral frame side.

* * * * *